United States Patent
Yun et al.

(10) Patent No.: US 8,036,695 B2
(45) Date of Patent: Oct. 11, 2011

(54) POWER CONTROL APPARATUS IN MOBILE TERMINAL

(75) Inventors: Chul-Ho Yun, Gumi-si (KR); Sueng-Jae Lee, Seoul (KR); Dae-Kwang Kim, Chilgok-gun (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 550 days.

(21) Appl. No.: 12/191,554

(22) Filed: Aug. 14, 2008

(65) Prior Publication Data

US 2009/0088225 A1    Apr. 2, 2009

(30) Foreign Application Priority Data

Sep. 27, 2007    (KR) ........................ 10-2007-0097338

(51) Int. Cl.
*H04B 7/00*    (2006.01)
*H04Q 7/20*    (2006.01)

(52) U.S. Cl. ........ 455/522; 455/572; 455/574; 455/423; 455/69; 455/127.2; 455/343.1; 455/571; 320/106; 330/10; 330/129; 370/338

(58) Field of Classification Search .................. 455/522, 455/572, 574, 423, 69, 571, 127.2, 343.1; 320/106; 330/10
See application file for complete search history.

(56) References Cited

U.S. PATENT DOCUMENTS

| | | | | |
|---|---|---|---|---|
| 5,548,823 A * | 8/1996 | Hirasawa et al. | ............ | 455/572 |
| 5,594,735 A * | 1/1997 | Jokura | ........... | 370/337 |
| 5,854,784 A * | 12/1998 | Solve et al. | ................... | 370/311 |
| 5,933,418 A * | 8/1999 | Massingill et al. | ........... | 370/321 |
| 6,018,642 A * | 1/2000 | Adachi | .......... | 340/7.33 |
| 6,029,074 A * | 2/2000 | Irvin | .............. | 455/571 |
| 6,081,727 A * | 6/2000 | Kondo | .......... | 455/522 |
| 6,088,600 A * | 7/2000 | Rasmussen | .................. | 455/574 |
| 6,226,526 B1 * | 5/2001 | Sakoda et al. | ................ | 455/522 |
| 6,230,022 B1 * | 5/2001 | Sakoda et al. | ................ | 455/522 |
| 6,434,395 B1 * | 8/2002 | Lubin et al. | ................... | 455/466 |
| 6,832,075 B1 * | 12/2004 | Henry, Jr. | ................... | 455/67.14 |
| 7,286,802 B2 * | 10/2007 | Beyme et al. | ............. | 455/67.14 |

* cited by examiner

*Primary Examiner* — Marceau Milord
(74) *Attorney, Agent, or Firm* — Jefferson IP Law, LLP

(57) ABSTRACT

An apparatus for controlling power of a mobile terminal is provided. The apparatus includes a power conversion for providing a ground connection during a time interval if a power value is input for testing the mobile terminal and a power control unit having one terminal for controlling the power of the mobile terminal wherein, if the given power value is grounded during the time interval and a voltage level required to control power of the mobile terminal changes, the power control unit turns on power to the mobile terminal.

11 Claims, 3 Drawing Sheets

POWER CONTROL APPARATUS IN MOBILE TERMINAL

PRIORITY

This application claims the benefit under 35 U.S.C. §119 (a) of a Korean patent application filed in the Korean Industrial Property Office on Sep. 27, 2007 and assigned Serial No. 2007-97338, the entire disclosure of which is hereby incorporated by reference.

BACKGROUND OF THE INVENTION

1. Field of the Invention

The present invention relates to an apparatus for controlling power of a mobile terminal. More particularly, the present invention relates to an apparatus for controlling power of a mobile terminal when the mobile terminal is connected to a test apparatus.

2. Description of the Related Art

Usually, the term "mobile terminal" refers to a device that provides a communication function in which a user can communicate with another user or exchange data with another party while the user is moving.

Over time and with the advancements in mobile communication technology, mobile terminals are commonly used throughout the world, and have effectively become a necessity in the daily life of modern people. One such advancement in mobile communication technology is the reduction of the overall size of a typical mobile terminal. That is, in consideration of the portability of the mobile terminal, the mobile terminal is getting smaller, slimmer, and lighter.

As part of the trend towards a smaller size and a slimmer shape of the mobile terminal, much research effort is being exerted in order to efficiently use space within the mobile terminal. One result of this effort is that miniaturized parts have been developed and released into the market.

One component or part of the mobile terminal is the power control unit. A typical power control unit, which controls turning the power to the mobile terminal on and off, includes a first terminal and a second terminal. The first terminal is used to turn on the power of the mobile terminal when the mobile terminal is connected to a test apparatus, for example during testing of the mobile terminal in a production stage or an after-service stage. The second terminal is used to turn on the power of the mobile terminal in connection with the mobile terminal's typical usage, for example by input from a user of a power key mounted in the mobile terminal.

Referring to FIG. 1, a description will be made of a power control unit equipped with a first and a second terminal for turning on the power of the mobile terminal as described above. FIG. 1 is a circuit diagram illustrating power control of a conventional mobile terminal connected to a test apparatus.

Referring to FIG. 1, a power supply unit 30 performs a function of supplying power to a mobile terminal 10 in order to test the mobile terminal 10. Also, a test apparatus 20 is connected to the mobile terminal 10, and performs a function of testing the mobile terminal 10.

The test apparatus 20 includes a power supply terminal 21 and a tester power terminal 22. Herein, the power supply terminal 21 is used to provide power to the mobile terminal 10. The tester power terminal 22 is used to control power of the mobile terminal 10. That is, the tester power terminal 22 is used to control turning the mobile terminal 10 on.

The mobile terminal 10 includes a power control unit 11, a user power key 14, and a built-in battery 15. With these components, a user is able to turn on the power of the mobile terminal during normal use.

That is, the power control unit 11 controls power-on/off of the mobile terminal 10. The power control unit 11 also performs a function of supplying power to each configuration unit (not shown) of the mobile terminal 10 in response to the power-on of the mobile terminal 10.

The power control unit 11 includes a first terminal 12 and a second terminal 13. Herein, the first terminal 12 is used to turn on the power of the mobile terminal 10 in connection with the test apparatus 20. The second terminal 13 is used to turn on the power of the mobile terminal 10 in connection with the user power key 14 mounted in the mobile terminal 10.

A description will now be made of a process for turning on the power of the mobile terminal 10 having the configuration as described above. The first terminal 12 and the second terminal 13 included in the power control unit 11 are preset to respective initial levels thereof, regardless of a power value provided to the power control unit 11. At this time, it is assumed that the preset initial levels of the first terminal 12 and the second terminal 13 are low and high, respectively.

First, when the power control unit 11 is connected to the test apparatus 20, the power control unit 11 receives input power from the power supply terminal 21 of the test apparatus 20. As illustrated, the input power supplied from power supply terminal 21 is electrically connected to the power control unit 11 at a point where connection of the built-in battery 15 is also made. Then, the first terminal 12 of the power control unit 11 is connected to the tester power terminal 22.

As stated above, the preset initial level of the first terminal 12 is low. When a voltage value, sufficient for power control of the mobile terminal, is input from the tester power terminal 22 to the first terminal 12, a voltage level of the first terminal 12 changes from low to high.

When the voltage value is input to the first terminal 12 such that the voltage level changes from low to high, a rising edge occurs at the first terminal 12 through the change as described above. Using the change in voltage values, the power control unit 11 detects the occurrence of the rising edge, and turns on the power of the mobile terminal 10. Accordingly, the test apparatus 20 can be used to determine successful operation of the mobile terminal 10 as part of a post-production testing program.

After successful testing and when the mobile terminal 10 is in service, the built-in battery 15 is mounted in the mobile terminal 10 and connected to the power control unit 11. With the built-in battery now mounted and connected in the mobile terminal, the power control unit 11 receives as input a voltage value from the built-in battery 15. If the user power key 14 is pressed for a predetermined time interval, the second terminal 13 of the power control unit 11 is connected to ground for the predetermined time interval through the user power key 14. At this time, the voltage level of the second terminal 13 changes from high to low (where an initial level is high), as the second terminal 13 is connected to the ground. After the predetermined time interval, the voltage level of the second terminal 13 changes from low to high again.

When a falling edge occurs in the voltage level of the second terminal 13 through the change as described above, the power control unit detects the occurrence of the falling edge, and turns on the power of the mobile terminal 10.

As described above, the power control unit 11 is equipped with the first and second terminals 12 and 13 respectively connected to the test apparatus 20 and the user power key 14.

With the connection as described above, the power control unit 11 detects a change of a voltage level either in the first terminal or in the second terminal, and turns on the power of the mobile terminal 10 based on the detected change of the voltage level.

However, the first terminal 12 is only used in a process for testing the mobile terminal 10, such as a production test or an after-service test. Accordingly, the first terminal 12, which is not required during ordinary use of the mobile terminal 10, causes an inefficient use of space.

SUMMARY OF THE INVENTION

An aspect of the present invention is to address the above-mentioned problems and/or disadvantages and to provide at least the advantages described below. Accordingly, an aspect of the present invention is to provide an apparatus for controlling power of a mobile terminal equipped with one power terminal.

In accordance with an aspect of the present invention, an apparatus for controlling power of a mobile terminal is provided. The apparatus includes a power conversion unit for providing a ground connection during a time interval if a power value is input for testing the mobile terminal and a power control unit having one terminal for controlling the power of the mobile terminal, wherein if the power value is grounded during the time interval and a voltage level required to control power of the mobile terminal changes, the power control unit turns on power to the mobile terminal.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which.

Throughout the drawings, it should be noted that like reference numbers are used to depict the same or similar elements, features and structures.

DETAILED DESCRIPTION OF THE EXEMPLARY EMBODIMENTS

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, descriptions of well-known functions and constructions are omitted for clarity and conciseness.

Figure 1:
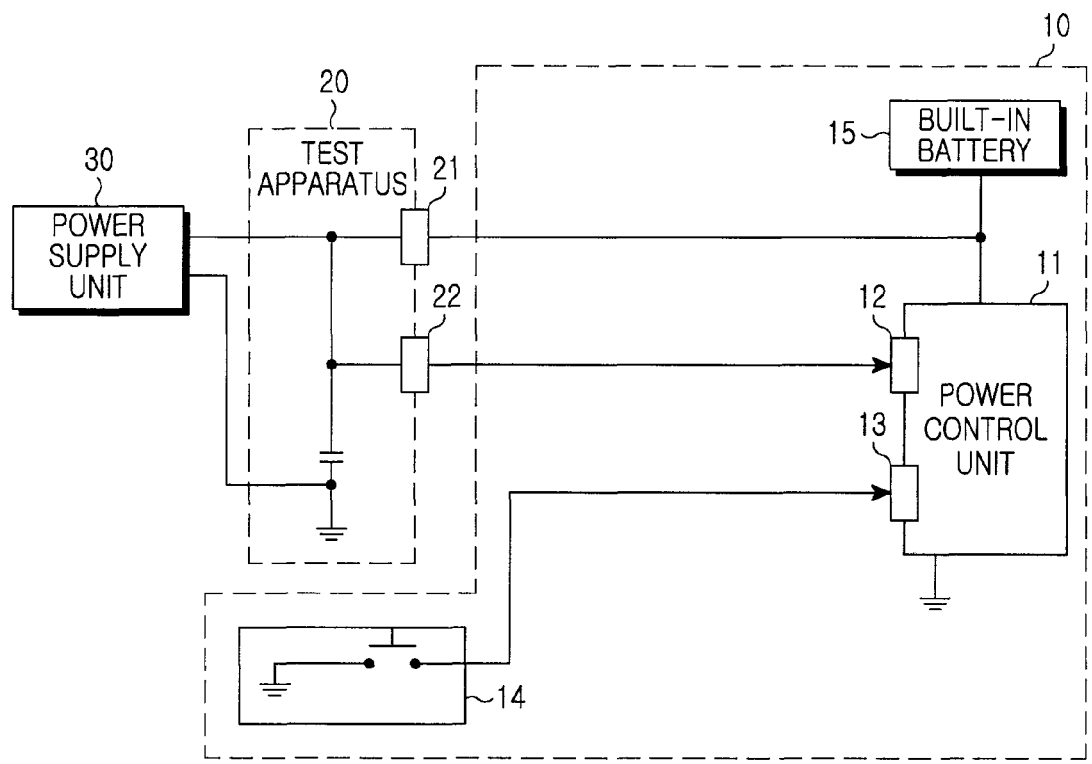
FIG. 1 is a circuit diagram illustrating power control of a conventional mobile terminal connected to a test apparatus.
Figure 2:
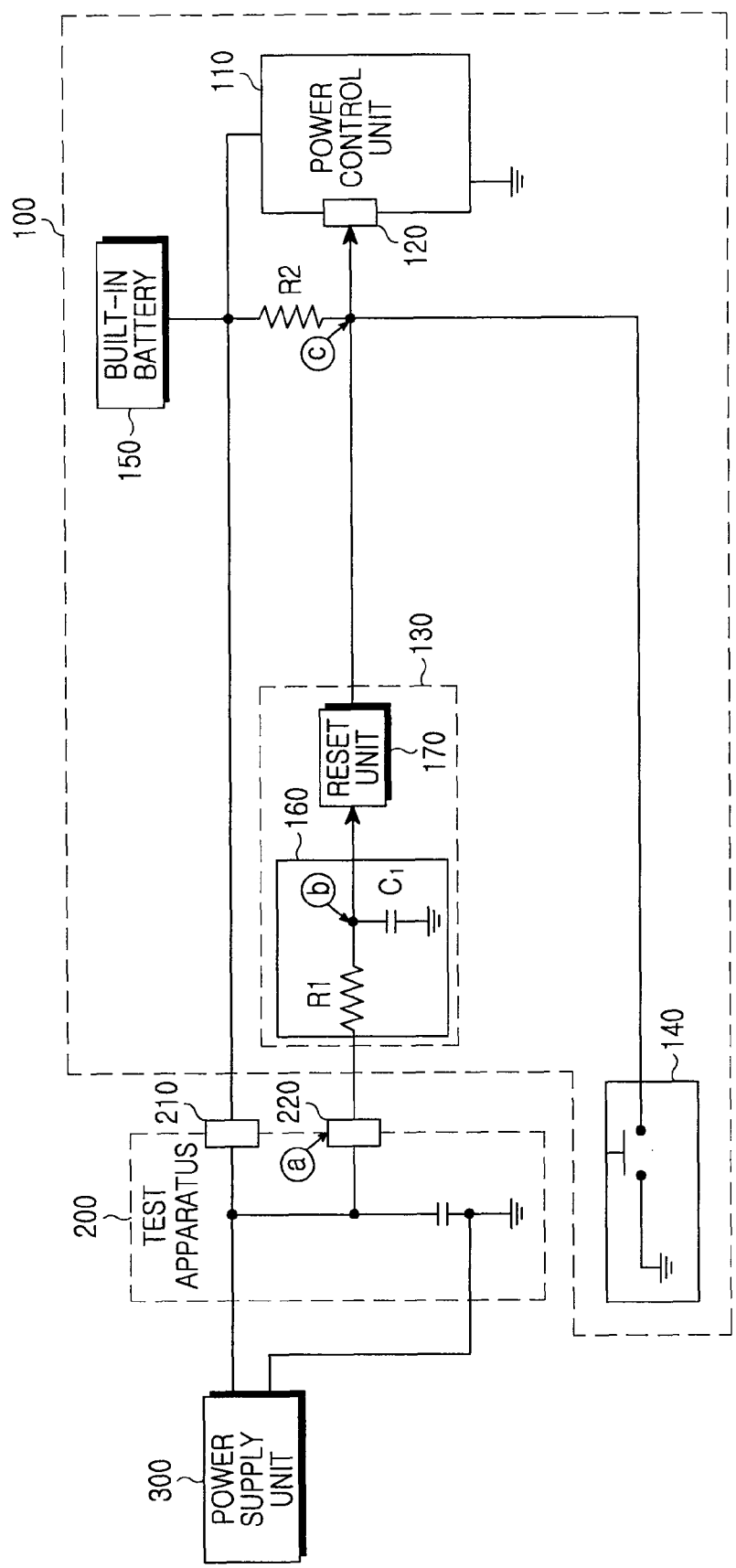
FIG. 2 is a circuit diagram illustrating power control of a mobile terminal connected to a test apparatus according to an exemplary embodiment of the present invention.

FIG. 2 is a circuit diagram illustrating power control of a mobile terminal connected to a test apparatus according to an exemplary embodiment of the present invention.

Referring to FIG. 2, a power supply unit 300 performs a function of supplying power to a mobile terminal 100 in order to test the mobile terminal 100. Also, a test apparatus 200 is connected to the mobile terminal 100, and performs a function of testing the mobile terminal 100.

The test apparatus 200 is equipped with a power supply terminal 210 and a tester power terminal 220. Herein, the power supply terminal 210 is used to provide power to the mobile terminal 100. The tester power terminal 220 is used to provide power for control of the mobile terminal 100. That is, the tester power terminal 220 is used to control turning the mobile terminal 10 on.

The mobile terminal 100 includes a power control unit 110, a power conversion unit 130, a user power key 140, and a built-in battery 150.

The power control unit 110 is equipped with one terminal referred to as a "third terminal" 120. The third terminal 120 is connected to the test apparatus 200 for testing the mobile terminal 100 and to the user power key 140 used for turning on the mobile terminal 100.

The power control unit 110 receives voltage, through the third terminal 120 from either the power supply unit 300 or the built-in battery 150, for the controlling the power-on/off of the mobile terminal 100. When a change occurs in the voltage provided to the power control unit 110 through the third terminal 120 such that the power control unit 110 detects a falling edge or a rising edge of the voltage level, the power control unit 110 controls the power-on/off of the mobile terminal 100 accordingly.

In response to the power-on/off of the mobile terminal 100, the power control unit 110 performs a respective function of supplying or shutting off power to multiple configuration units, not shown, including a control unit, a display unit, etc., equipped within the mobile terminal 100.

The power conversion unit 130 includes a Resistor and a Capacitor (RC) filter 160 and a reset unit 170.

When the voltage for control of the mobile terminal 100 is input from the power supply unit 300 through the tester power terminal 220, the RC filter 160 performs a function of outputting a voltage value to the reset unit 170. Based on the electrical characteristics of the RC filter 160, a voltage level of the reset unit 170 may rise steadily.

As will be explained in more detail below with reference to FIG. 3, when the steadily rising voltage level of the reset unit 170 reaches a preset drive level, the reset unit 170 operates as ground for a predetermined time interval.

When the reset unit 170 operates as ground for the predetermined time interval, it performs a function of grounding the voltage provided from the power supply terminal 210 to the third terminal 120 during the predetermined time interval. Herein, the preset drive level and the predetermined time interval (i.e. a reset time) may change depending on each specification of reset Integrated-Circuits (ICs).

A method for turning on the power of the mobile terminal according to an exemplary embodiment of the present invention will be described with reference to the configuration illustrated in FIG. 2 as described above and FIG. 3.

Figure 3:
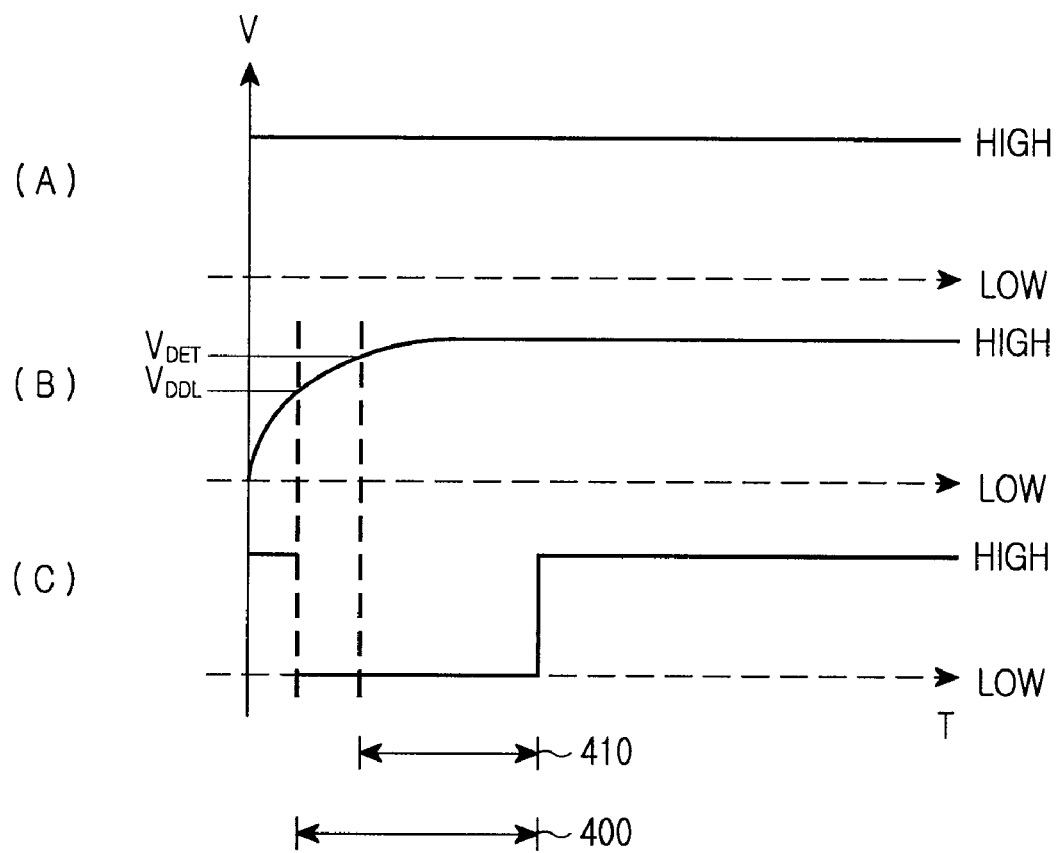
FIG. 3 is a graph illustrating a change of a voltage level in a power value provided from a test apparatus to a mobile terminal according to an exemplary embodiment of the present invention.

FIG. 3 is a graph illustrating a change of a voltage level provided from a test apparatus to a mobile terminal according to an exemplary embodiment of the present invention.

Referring to FIGS. 2 and 3, when the power supply terminal 210 of the test apparatus 200 is connected to the third terminal 120 included in the power control unit 110, the power supply terminal 210 of the test apparatus 200 outputs a power value (e.g. voltage) for the power-on of the mobile terminal 100 to the third terminal 120. The third terminal 120 of the power control unit 110 receives as input the given power value from the power supply terminal 210 through a second resistor R2, and maintains a voltage level so as to be high.

Upon receiving as input the power value from the power supply unit 300, the tester power terminal 220 of the test apparatus 200 outputs the power value to the RC filter 160.

Then, the RC filter 160 regularly receives as input the power value provided by the tester power terminal 220. That is, the output of the tester power terminal 220, which is input to the RC filter 160, is maintained at a voltage level so as to be high as illustrated in frame (A) of FIG. 3 in response to the power value received from the power supply unit 300.

Upon receiving as input the power value from the tester power terminal 220 as described above, the RC filter 160 outputs a given power value to the reset unit 170 through a first resistor R1 and a first capacitor C1. Based on the electrical characteristics of the first resistor R1 and a first capacitor C1, the voltage input to the reset unit 170 will begin to steadily rise.

As the reset unit 170 starts to receive as input the given power value from the RC filter 160, a voltage level of the reset unit 170 steadily rises from low to high as illustrated in frame (B) of FIG. 3.

When the voltage level of the reset unit 170 rises steadily in response to the power value and then reaches a preset level $V_{DDL}$ as illustrated in frame (B) of FIG. 3, the reset unit 170 determines that the voltage level reaching the preset level $V_{DDL}$ is a signal required for starting to drive the reset unit 170. Once the reset unit 170 is driven, it then operates as a ground. That is, it provides a path to ground. Herein, the level $V_{DDL}$ represents a voltage level used to determine if the reset unit 170 should start to be driven, and is preset depending on each specification of the reset ICs.

When the reset unit 170 starts to perform the function of grounding the power value at the drive level $V_{DDL}$, the given power value for the power-on provided from the power supply unit 210 to the power control unit 110 is grounded through the reset unit 170. Accordingly, a voltage level of the third terminal 120 of the power control unit 110 changes from high to low as illustrated in frame (C) of FIG. 3.

At this time, the power control unit 110 determines that a falling edge occurs through the change in the voltage level, and then turns on the power of the mobile terminal 100.

Meanwhile, the reset unit 170 should start to be driven when the voltage level of the reset unit 170 reaches the $V_{DDL}$, but a drive time (i.e. a reset time) required to drive the reset unit 170 starts to be determined from $V_{DET}$ having a larger value than the $V_{DDL}$ due to the characteristics of the reset IC, as illustrated in frame (B) of FIG. 3.

Hence, the reset unit 170, according to an exemplary embodiment of the present invention, operates as ground for a time interval designated by reference numeral 400 in frame (C) of FIG. 3, but the reset time of the reset unit 170 actually corresponds to a time interval designated by reference numeral 410 in frame (C) of FIG. 3 as described above.

Thereafter, when a preset reset time passes, the reset unit 170 stops operating. Accordingly, the third terminal 120 of the power control unit 110 receives as input a given power value for the power-on from the power supply terminal 210 again.

If the user power key 140 included in the mobile terminal 100 is input for a predetermined time interval, while the power of the mobile terminal 100 is turned on and the function of the mobile terminal 100 is performed, the given power value provided from the power supply terminal 210 to the third terminal 120 is grounded for the predetermined time interval equivalent to an input time of the user power key 140.

If this happens, the power control unit 110 determines a falling edge occurring due to a voltage level changing from high to low and the input time of the user power key 140 for the predetermined time interval equivalent to the input time of the user power key 140. Then, the power control unit 110 turns off the power of the mobile terminal 100 based on the determination as described above.

If the user power key 140 is input within the predetermined time interval, the power control unit 110 detects that a voltage level of the third terminal 120 changes for a predetermined time interval equivalent to an input time of the user power key 140, and determines a falling edge occurring at this time. Then, the power control unit 110 completes a function performed by the mobile terminal 100 based on the determination as described above, and controls the mobile terminal 100 in order to switch to a standby mode.

If the power control unit 110 is not connected to the test apparatus 200, but to the built-in battery 150 mounted in the mobile terminal 100, the third terminal 120 of the power control unit 110 is supplied with power by the built-in battery 150, and maintains an initial level of a voltage level of the third terminal 120 so as to be high.

Thereafter, when the user power key 140 is input for a predetermined time interval by a user, a power value for power-on provided from the built-in battery 150 to the third terminal 120 is grounded for the predetermined time interval equivalent to an input time of the user power key 140.

As a result, a voltage level of the third terminal 120 changes from high to low (where the initial level is high), so that a falling edge occurs in the voltage level of the third terminal 120. Accordingly, the power control unit 110 detects the falling edge after the predetermined time interval passes, and turns on the power of the mobile terminal 100.

According to exemplary embodiments of the present invention as described above, the power control unit of the mobile terminal is equipped having one terminal, so that it is possible to reduce costs in a mobile terminal that was previously equipped with two terminals.

Also, it is possible to satisfy a requirement for efficiently using a space within the mobile terminal as the mobile terminal becomes smaller.

While the invention has been shown and described with reference to certain exemplary embodiments thereof, it will be understood by those skilled in the art that various changes in form and details may be made therein without departing from the spirit and scope of the invention. Therefore, the spirit and scope of the present invention must be defined not by described embodiments thereof but by the appended claims and equivalents of the appended claims and their equivalents.

What is claimed is:

1. An apparatus for controlling power of a mobile terminal, the apparatus comprising:
   a power conversion unit for providing a ground connection during a time interval of a time of operation of the mobile terminal if a power value is input for testing the mobile terminal; and
   a power control unit having one terminal for controlling the power of the mobile terminal wherein, if the power value is grounded during the time interval and a voltage level required to control power of the mobile terminal changes, the power control unit turns on power to the mobile terminal, wherein the ground terminal connection is not provided by the power conversion unit for a remaining time of the time of operation of the mobile terminal.

2. The apparatus of claim 1, wherein the power value is supplied to the one terminal of the power control unit.

3. The apparatus of claim 2, wherein the power value is grounded by at least one of an input of a power key or an operation of the power conversion unit.

4. The apparatus of claim 1, wherein the power value for testing the mobile terminal is input from a test apparatus.

5. The apparatus of claim 1, wherein the voltage level required to control power of the mobile terminal changes from a high state to a low state to turn on the mobile terminal.

6. The apparatus of claim 1, wherein the power conversion unit comprises:
   a Resistor and Capacitor (RC) filter for receiving the power value as the input from the test apparatus; and
   a reset unit for receiving the power value from the RC filter and for operating to provide the ground connection in order to ground the power value during the time interval.

7. The apparatus of claim 6, wherein the RC filter outputs the received power value as a rising voltage to the reset unit and further wherein the reset provides the ground connection if the voltage level rises to a drive level required to drive the reset unit.

8. The apparatus of claim 1, wherein the power control unit turns off power of the mobile terminal, if the power control unit detects a change of the voltage level required to control the power-on/off based on an input time of the power key in a state where the power of the mobile terminal is turned on.

9. The apparatus of claim 8, wherein the power control unit further controls the mobile terminal in order to complete a function to be executed by the mobile terminal.

10. The apparatus of claim 9, wherein, if the input time of the power key is equal to or longer than the time interval, the power value of the power control unit is grounded through the one terminal included in the power control unit during the time interval corresponding to the input time, and the power of the mobile terminal is turned off.

11. The apparatus of claim 9, wherein, if the input time of the power key is less than the time interval, the power value of the power control unit is grounded through the one terminal included in the power control unit during the time interval corresponding to the input time, and the function of the mobile terminal is completed.

* * * * *